(12) United States Patent
Jacobs et al.

(10) Patent No.: US 7,103,714 B1
(45) Date of Patent: *Sep. 5, 2006

(54) SYSTEM AND METHOD FOR SERVING ONE SET OF CACHED DATA FOR DIFFERING DATA REQUESTS

(75) Inventors: Lawrence Jacobs, Redwood City, CA (US); Xiang Liu, San Mateo, CA (US); Shehzaad Nakhoda, Palo Alto, CA (US); Rajiv Mishra, Foster City, CA (US); Zheng Zeng, Foster City, CA (US); Sachin Desai, San Francisco, CA (US)

(73) Assignee: Oracle International Corp., Redwood Shores, CA (US)

( * ) Notice: Subject to any disclaimer, the term of this patent is extended or adjusted under 35 U.S.C. 154(b) by 808 days.

This patent is subject to a terminal disclaimer.

(21) Appl. No.: 09/923,102

(22) Filed: Aug. 4, 2001

(51) Int. Cl.
*G06F 12/00* (2006.01)
(52) U.S. Cl. .................. 711/113; 709/228; 709/229; 711/130; 711/133
(58) Field of Classification Search .............. 435/6; 709/203, 226, 202, 213, 246, 228, 229; 707/10; 711/202, 113, 130, 133; 713/100
See application file for complete search history.

(56) References Cited

U.S. PATENT DOCUMENTS

| | | | |
|---|---|---|---|
| 5,611,049 A | | 3/1997 | Pitts |
| 5,740,430 A | * | 4/1998 | Rosenberg et al. ......... 707/200 |
| 5,864,854 A | * | 1/1999 | Boyle ........................ 707/10 |
| 5,931,904 A | | 8/1999 | Banga et al. |
| 6,026,474 A | * | 2/2000 | Carter et al. ............... 711/202 |
| 6,064,406 A | * | 5/2000 | Atkinson et al. ........... 713/100 |
| 6,085,234 A | | 7/2000 | Pitts et al. |
| 6,225,995 B1 | | 5/2001 | Jacobs et al. |
| 6,253,234 B1 | * | 6/2001 | Hunt et al. ................. 709/213 |
| 6,360,249 B1 | | 3/2002 | Courts et al. |
| 6,505,230 B1 | * | 1/2003 | Mohan et al. .............. 709/202 |
| 6,507,891 B1 | * | 1/2003 | Challenger et al. ........ 709/226 |
| 6,553,411 B1 | | 4/2003 | Dias et al. |
| 6,611,876 B1 | * | 8/2003 | Barrett et al. .............. 709/246 |
| 6,640,240 B1 | * | 10/2003 | Hoffman et al. ........... 709/203 |

(Continued)

OTHER PUBLICATIONS

Candan, et al., Enabling Dynamic Content Caching for Database-Driven Web Sites. ACM SIGMOD May 21-24, 2001, Santa Barbara, CA, Copyright 2001 ACM.

(Continued)

*Primary Examiner*—John Follansbee
*Assistant Examiner*—Dustin Nguyen
(74) *Attorney, Agent, or Firm*—Park, Vaughan & Fleming LLP

(57) ABSTRACT

A system and method for enabling a cache system, operating on behalf of a data server (e.g., web server, application server, database server), to serve one set of data in response to multiple requests that differ in content or form. In particular, the requests may include different session identifiers for identifying different users, clients or sessions, but they target the same basic set of data (e.g., a web page). When a set of data is cached in response to a request having one session identifier, it can also be served in response to another request having a second session identifier because the session identifiers are deleted, masked, replaced or otherwise ignored when searching the cache system for data responsive to the second request. Also, the cache system may include a requestor's session identifier as part of a data identifier (e.g., URI, hyperlink) within data served to the requester.

18 Claims, 3 Drawing Sheets

U.S. PATENT DOCUMENTS 6,947,992 B1 * 9/2005 Shachor ............... 709/228
2003/0023873 A1 * 1/2003 Ben-Itzhak ............ 713/201

OTHER PUBLICATIONS

Challenger, et al., A Scalable System for Consistently Caching Dynamic Web Data. IBM Research, Yorktown Heights, NY.

Challenger, et al., A Publishing System for Efficiently Creating Dynamic Web Content. IBM Research, Yorktown Heights, NY.

Datta, et al., A Comparative Study of Alternative Middle Tier Caching Solutions to Support Dynamic Web Content Acceleration. Proceedings of the 27th VLDB Conference, Roma, Italy, 2001.

Degenaro, et al., A Middleware System Which Intelligently Caches Query Results. IBM Research, Yorktown Heights, NY, Copyright 2000, Springer-Verlag.

Wessels, et al., ICP and the Squid Web Cache, pp. 1-25. Aug. 13, 1997.

Wessels, et al., Internet Cache Protocol (ICP), version 2, pp. 1-9. National Laboratory for Applied Network Research/UCSD, Sep. 1997.

Kantor, et al., Network News Transfer Protocol: A Proposed Standard for the Stream-Based Transmission of News, pp. 1-27. Feb. 1986.

Akamai white paper: Turbo-Charging Dynamic Web Sites with Akamai EdgeSuite, pp. 1-16. www.akamai.com, Sep. 23, 2002. Copyright 2001, Akamai Technologies, Inc.

A Distributed Infrastructure for e-Business-Real Benefits, Measurable Returns, pp. 1-28. www.akamai.com, Sep. 23, 2002. Copyright 2000 and 2001, Akamai Technologies, Inc.

Edge Sides Includes (ESI) Overview, pp. 1-7. www.esi.org, Sep. 23, 2002. Copyright 2001, Oracle Corporation, Akamai Technologies, Inc.

Tsimelzon, et al., Edge Sides Includes ESI-Accelerating E-Business Applications: Language Specification 1.0, pp. 1-12. www.esi.org/language_spec_1-0.html, Sep. 23, 2002. Copyright 2001, Akamai Technologies, Oracle Corporation.

Nottingham, et al., Edge Side Includes ESI-Accelerating E-Business Applications: Edge Architecture Specification, pp. 1-6. www.esi.org/architecture_spec_1-0.html, Sep. 23, 2002. Copyright 2001, Akamai Technologies, Oracle Corporation.

Jacobs, et al., Edge Side Includes ESI-Accelerating E-Business Applications: ESI Invalidation Protocol 1.0, pp. 1-13. www.esi.org/invalidation_protocol_1-0.html, Sep. 23, 2002. Copyright 2001, Oracle Corporation.

Basu, et al., Edge Side Includes ESI-Accelerating E-Business Applications: JESI Tag Library 1.0 Specification: Tags for Edge-Side Includes in JSP, pp. 1-19. www.esi.org/jesit_tag_lib_1-0.html, Sep. 23, 2002. Copyright 2001, Oracle Corporation, Akamai Technologies, Inc.

Challenger, et al., A Publishing System for Efficiently Creating Dynamic Web Content. (1999) Proceedings of the 18th Annual Joint Conference of the IEEE Computer and Communications Societies.

Challenger, et al., A Scalable System for Consistently Caching Dynamic Web Data. INFOCOMM, 2000.

* cited by examiner

SYSTEM AND METHOD FOR SERVING ONE SET OF CACHED DATA FOR DIFFERING DATA REQUESTS

BACKGROUND

This invention relates to the field of computer systems. More particularly, a system and methods are provided for caching and serving a single set of data for serving in response to dissimilar data requests.

In a computing environment in which a data server (e.g., an application server, web server, database server) stores data for access by users operating various client devices (e.g., computers, web-enabled telephones), a cache system is often employed to provide faster access to desired data. In particular, the cache system may receive users' data requests and serve the requested data if stored in the cache system. If the requested data is not cached in the cache system, the request is passed to the data server. In this type of environment, popular data items may be cached and served to users much faster than if each separate request for an item had to be passed to and handled by the data server.

In one type of existing cache system, when a data request is received it is compared against presently cached data and/or previous requests for which data was retrieved and cached. If an exact match is found, the matching cached data is served. Otherwise, the request is referred to and satisfied by the data server. Thus, in this type of system, as long as an identical request format is used, or as long as the data is described identically each time a particular set of data is desired, that data can be easily recognized as being responsive to the requests. Conversely, if requests from different users differ in content or in how they describe the desired data, the cache system cannot match a new request against the data cached in response to previous user's request for the same data, and will have to pass the request to the data server.

It is very common, in today's computing environments, for requests from different users for a single set of data to have different parameters or data descriptions. There may be a large number of different request formats (e.g., for different types of clients or user agents), or each request may be unique because of a unique parameter value or a unique way of describing the data. As a result, a typical cache system may add little value to a particular environment because it may have to pass each request for the data to the data server and end up serving it only for that request.

More specifically, a user's desired data may be identified in a data request (e.g., an http request) by a data identifier such as a URI (Uniform Resource Identifier) or URL (Uniform Resource Locator) that identifies a network address of the data or that is translatable into a network address. URIs in data requests are often supplemented, however, with session identifiers that can be used by an application, web server or data server to differentiate user sessions.

For example, a web server may assign a unique session identifier to a user when he or she first directs his/her browser to a particular web site. That session identifier may then be appended to a URI (e.g., a hyperlink) in a page of content served to the user so that if the user selects the URI, the session identifier is returned to the web server. The server is thus able to track a user as he or she browses. However, because of the unique session identifier that is appended to links or other portions of the content served to a user, that user's request will differ from other users' and the cache system provides no benefit by caching that content because it will not match any other users' request and thus will not be served to any other users.

Other means are sometimes used to identify users, clients or sessions—such as cookies. A cookie is generally assigned by a data server and passed to a user's browser. The browser is instructed to return the cookie to the data server each time the user connects to or browses data from the server. The cookie may be submitted as a parameter or tag within the request and, because different users will have different cookies, their requests will therefore differ and content cached and served for one user cannot be served to a different user.

In short, because of the manner in which data servers may identify or track users or user sessions in some computing environments, the benefits of a present cache system may be diminished or eliminated. Even though the same set of data may be requested by multiple users, the requests may differ in form or content and therefore a present cache system cannot serve the same cached copy of the data for each of the requests. Therefore, a system and a method are needed for facilitating the caching of data for service to multiple users in response to requests that differ, but which are for the same set of data.

Typical cache systems generally also cannot tailor or customize a set of data for different requests. If a particular request or requestor is to receive customized data (e.g., a shopping cart, a personalized web page, a special price for a product), the data server handles the request by assembling the appropriate data.

For example, a web server may be configured to customize or personalize a web page for different users (e.g., with a name, greeting, logo, icon), where much (or most) of the web page remains the same for each user, but a portion of the page differs. In this situation, the typical cache system must pass a user's request for the web page to the data server for personalized service. And, a version created (and cached) for one user cannot be used for another.

Thus, what is also needed is a cache system and a method for altering or customizing a cached set of data for service to multiple users.

SUMMARY

In one embodiment of the invention a system and methods are provided for serving one cached data item or set of data in response to multiple data requests that differ in form or content. More particularly, a single set of data may be served in response to data requests that include different client, user or session identifiers.

In an embodiment of the invention, data requests are received at a cache system configured to cache data from a data server (e.g., web server, application server, database server). The data requests include identifiers that are unique for a session, client, user or other discriminator. Session identifiers may be included in the requests as cookies, as distinct parameters or tags, or as part of a data identifier (e.g., a URI or URL).

In this embodiment, a set of data (e.g., a web page) is cached and served in response to a first request having a first session identifier. A second request is then received for the same set of data, but has a second session identifier different from the first session identifier. When the cache system searches its cache(s) for data that is responsive to the second request, the session identifier(s) of the first and/or second request are deleted, masked, replaced or otherwise ignored.

The cache system can therefore determine that the set of data served for the first request can also be served for the second request.

Before serving the requested data, the session identifier of the second request may be inserted into the data. If, for example, session identifiers are communicated within data requests as part of data identifiers of requested data then, in turn, if the requested data includes any data identifiers (e.g., hyperlinks), the session identifier may be added to them.

In one embodiment of the invention, data that may be served to multiple users, clients or other requesters may be cached with a default or a null value for a particular parameter of a data request for which the data may be served. Thus, regardless of what value the parameter (e.g., a session identifier) may have in a given request for the data, it may be replaced (with the default value) or masked so that the data can still be served for the request. In this embodiment, a user who has not yet registered or logged into the data server behind the cache, and therefore has not yet received a session identifier, may be served with cached data for a period of time without burdening the data server with the need to generate a session identifier. In particular, the default value is applied to the session identifier parameter for the user's data requests until data requested by the user is not in the cache (i.e., until a cache miss occurs). Then the user's request may be passed to the data server and he or she can be assigned a session identifier.

DETAILED DESCRIPTION

Figure 1:
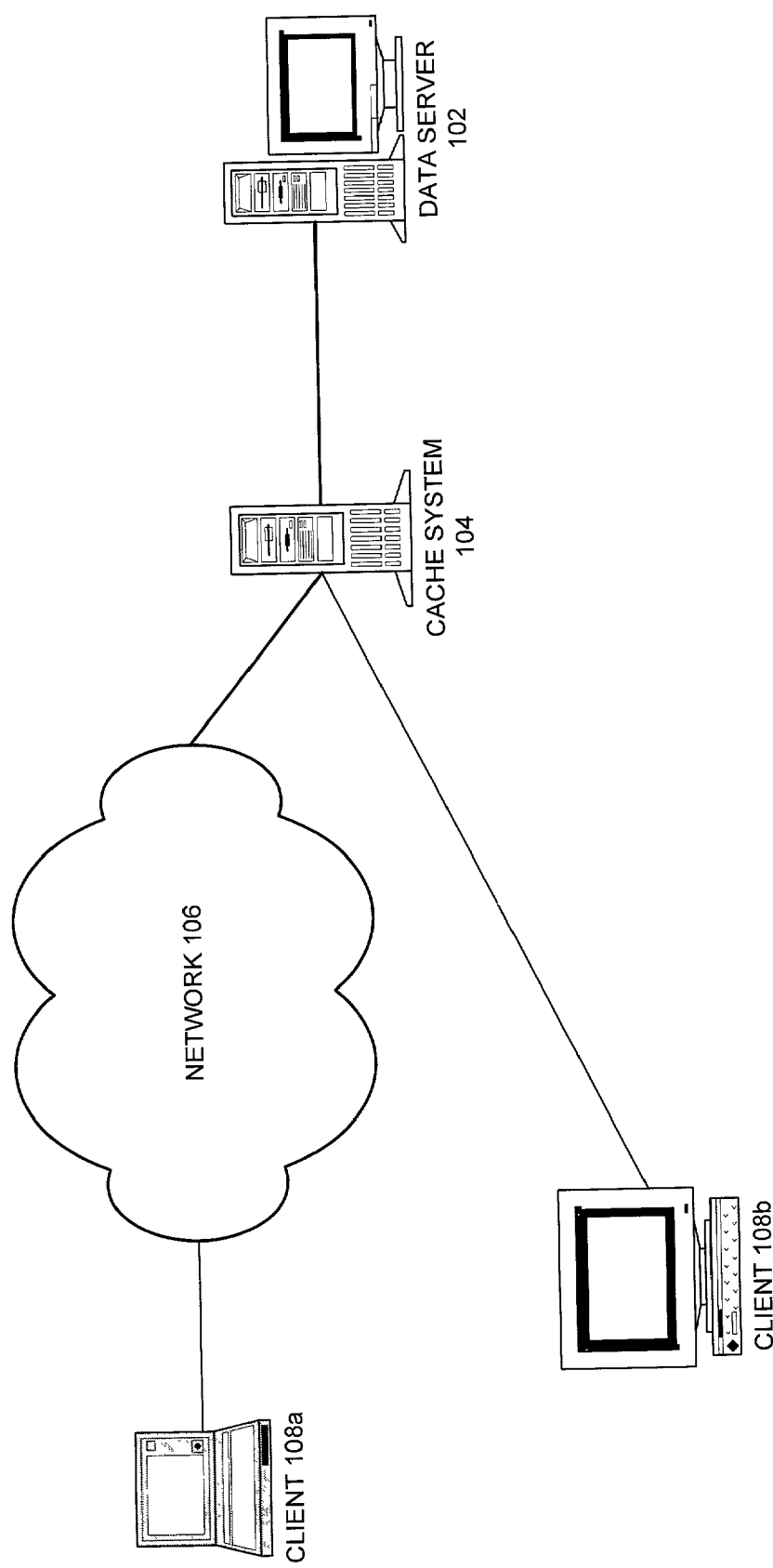
FIG. 1 is a block diagram depicting one system in which a cache system may serve a set of data to multiple different requests in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In embodiments of the invention described herein, systems and methods are described for caching dynamic data for service to clients, users or sessions. Cached data may comprise web pages, portions of a web page, data from a database, etc., and may take the form of text, audio, video and so on, which may be formatted according to HTML (Hypertext Markup Language), XML (Extensible Markup Language), or some other language or protocol.

In one embodiment of the invention, a cached data item or set of data is considered dynamic because it may be served in response to data requests that are not identical. In traditional cache systems, by way of contrast, a data request may be compared to presently cached data (or requests that caused the data to be cached) to find a matching entry, and each cache entry may only be servable for a matching request. In this embodiment of the invention, however, a cache system receives requests for one set of data or one data item from different client/user sessions, but the requests differ in their content or description of the desired data. In particular, the requests may include different session identifiers for identifying the client or user session to an application, web site, database, etc. Illustratively, a session identifier in an http (Hypertext Transport Protocol) request may be in the form of a cookie, may be embedded as part of a URI (Uniform Resource Identifier) identifying the desired data, or may take some other form. As one skilled in the art will appreciate, a traditional cache system could not cache, and serve, a single data item or set of data for requests that vary in this manner.

U.S. Pat. No. 6,225,995, which issued May 1, 2001 and is entitled "Method and Apparatus for Incorporating State Information into a URL," describes one method of maintaining state information within a client and is hereby incorporated by reference.

In another embodiment of the invention, dynamic content comprises data or other information that may be customized or personalized for different clients, users or sessions. Thus, a common data item or set of data may be cached for serving in response to different requests (e.g., requests having different content or form), but may be customized for the requester. The customization may involve inserting or substituting text, graphics, video, data or other information into the data to be served. The information that is inserted or substituted may depend upon an identity of the requestor, a session identifier, a location of the requestor, an organization the requestor is affiliated with, or some other attribute or factor.

FIG. 1 depicts an illustrative computing environment in which an embodiment of the invention may be implemented. Although the illustrated environment includes just one cache system and one data server, embodiments of the invention may be implemented in environments that include multiple cache systems and/or multiple data servers.

In FIG. 1, data server 102, which may be a web server, application server, database server, and so on, stores data that may be served to clients 108a, 108b. Clients 108a, 108b may comprise any type of computing device capable of communication with another computing device. Clients 108a, 108b may therefore comprise desktop, workstation, portable or hand-held devices, or suitably equipped communication devices (e.g., web-enabled telephones). The clients may further, or alternatively, comprise browsers or other user interfaces operated on such computing devices.

Cache system 104 caches data stored on server 102 for faster serving to clients. Cache system 104 is coupled to clients 108a, 108b via any suitable communication links, such as network 106 (which may be the Internet) or a direct link. Although data server 102 and cache system 104 are depicted as separate computers in FIG. 1, in an alternative embodiment of the invention a cache system may reside on the same computer system as the data server. Further, cache system 104 may be implemented as a cache cluster, a partitioned cache, or some other cooperative collection of caches, which may be geographically or logically dispersed within a LAN, WAN or other communication network.

Substituting Session Identifiers to Serve Common Data

In one embodiment of the invention, a set of data is cached and served in response to multiple requests for that data even though the requests differ in format or content. As described above, conventional cache systems are often not configured to serve cached data in response to a request that does not match a previous request for the data (i.e., the request for which the data was cached).

In particular, in one implementation of this embodiment data requests (e.g., from users or clients) include unique session identifiers. The session identifiers may be embodied as cookies, may be included as part of, or combined with, a URI (Uniform Resource Identifier) identifying the desired data, may take the form of unique parameters or tags within the requests, etc. Although termed "session" identifiers, they may identify or distinguish sessions, users, clients, user agents (e.g., browsers), or other entities.

In this embodiment, when a data request is compared to existing entries in a cache system, the session identifiers of the request and/or the cached data are ignored, masked or otherwise not considered. For example, when a set of data is cached the session identifier may be omitted from a description of the cached data to which subsequent data requests will be compared. Or, a default value may be substituted for the session identifier within a data request or within the description of the cached data. Thus, the cache system is configured to match a new request for a specific set of data with a cached version of that data, even if the session identifier of the new request differs from a session identifier of a previous request for the data or the request for which the data was originally cached.

In general, an embodiment of the invention may be implemented to substitute, mask, replace or ignore session identifiers and/or other information in a data request when attempting to find and/or serve cached data in response to the request. Thus, even though a set of data is cached in response to one data request, it may also be served in response to another request that differs in one or more fields, parameters or tags, or that describes the data differently.

In an embodiment of the invention in which default or null values for session identifiers are employed in order to match a new data request with a responsive set of data that was cached for a different request, the system may be able to serve data without requiring a user (e.g., a new user) to obtain a session identifier. In particular, the cache will use a default session identifier value to match the user's request with the requested data, if cached. When, however, the user requests data that is not cached, the request will then be passed to the data server and the user can be logged in or registered and a session identifier may be assigned. As a result, the cache hit ratio may be increased, and the cost of establishing a session for the user can be postponed.

One skilled in the art will appreciate that although the embodiments of the invention described in this section address the satisfaction of data requests that differ according to their session identifiers, other embodiments may be derived from these descriptions for serving a common set of data in response to data requests that differ in other ways (e.g., other parameters, values, tags).

In an embodiment of the present invention, when a first request for a set of data (e.g., a web page, a portion of a web page, contents of a database) is received at a cache system, the cache system searches its cache(s) for an entry that matches the request. Because it is the first request, no match will be found, and the cache system will initiate a request, or pass the original request, to a data server. The data server analyzes the request, retrieves or assembles the desired data and returns it to the cache system. The cache system caches the data and serves it to the requesting client or user.

In this embodiment, clients/users or individual client/user sessions are identified to the data server and the cache system by unique session identifiers. Illustratively, the data server assigns a session identifier to a client the first time the client connects to the system (e.g., the cache system, the data server, a web site associated with the data server) or the first time a request from the client is received by the data server. A session identifier may have an expiration, in which case the session identifier expires after a specified period of time unless, perhaps, the client resumes or again makes contact with the system during that time. The session identifier may be passed directly from the data server to the client or may be returned to the client through the cache—perhaps with a requested set of data.

The client's browser or other module may be configured or instructed to send the session identifier each time a request or other communication is sent to the system. In this embodiment the session identifier may be sent as a cookie, in which case it may be included in each request or communication as a separate parameter or tag.

A session identifier may also be communicated in a form other than a cookie. In particular, a client's browser may be configured to avoid the use of cookies or, the application that produces or provides the requested data may be configured to use a different form. For example, the system may be configured to embed the client's session identifier in a data link, a data identifier (e.g., a URI), or some other portion of the data served to the client. The session identifier may, in particular, be attached to information that the client will return to the cache system or data server with a subsequent request or communication.

Thus, a web page that may be served to a client may include hyperlinks to other web pages, web sites or other information. Each such link may include a URI, network address or other means of identifying the destination. A session identifier may be appended to or inserted in the URI or address and, when a user selects a link and the client transmits the link information to the system, the session identifier may be extracted and used to identify the client or session.

Thus, either by way of a cookie or by being embedded within information that is submitted with a data request, a session identifier is provided to a cache system with a data request.

The cache system may be configured with a parsing module to recognize data requests and/or retrieve necessary information from a request. Different parsing modules may be configured for different languages or protocols, such as HTML (Hypertext Markup Language), XML (Extensible Markup Language), HTTP (Hypertext Transport Protocol), etc. Or, one parsing module may be configured to handle multiple languages and/or protocols.

When a data request is received, the cache system parses the request to retrieve the session identifier—either from a cookie (e.g., a distinct parameter or tag within the request) or from the URI or other descriptor or identifier of the desired data. The cache system then compares the request against the data it has cached, or descriptions of the data. For example, a set of cached data (e.g., a web page) may be stored with a URI of the data or the request that caused the data to be retrieved from the data server.

In this embodiment, the cache system is configured to ignore, mask or replace (e.g., with a default value) the session identifier of the data request when searching for matching cached data, and/or the session identifiers of the cached data. If the new data request and a data request that caused the requested data to be cached differ according to information that the cache system is programmed to disregard (e.g., session identifiers), the cache system will be able to easily match the new request with the responsive data.

The responsive data is thus retrieved from a cache and served in response to the request. However, in this embodiment, the session identifier received with the request may be inserted into the data before serving it. Illustratively, the session identifier may be inserted in whichever form the client expects or will accept it (e.g., as a cookie and/or as part of a data identifier such as a URI or URL). If the requested data includes a session identifier in multiple locations (e.g., for multiple hyperlinks in a web page), the session identifier of the request may be inserted at one location, many locations, or all locations.

In one embodiment of the invention, a cache system is configured to receive information identifying the form, structure or pattern of information that may differ between requests, but which should be processed to allow one set of data to serve multiple different requests. The information may be received from a database administrator, application developer or other responsible party. For example, the cache system may be configured to search for the pattern &sesID=xxxx in a data request, where "sesID" is the name of the session identifier parameter, and "xxxx" represents a value for the session identifier parameter (which may be in alphabetic, numeric, alphanumeric or other form). The entire data request may be searched for the desired parameter or the pattern of the parameter, or one or more data identifiers may be searched.

Figure 2:
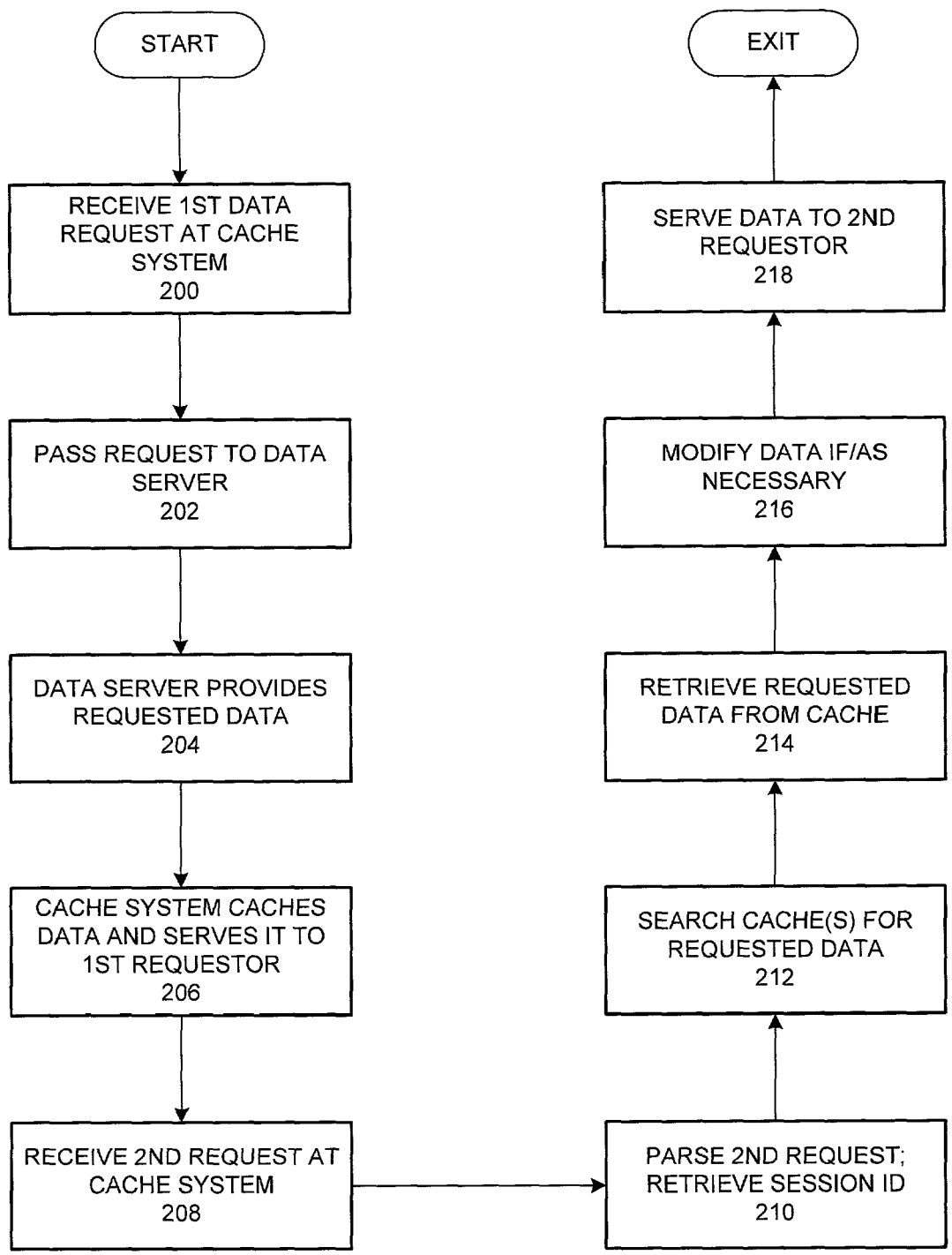
FIG. 2 is a flowchart illustrating one method of serving one set of data for requests that differ in form or content in accordance with an embodiment of the invention.

FIG. 2 demonstrates one method of serving one set of cached data (e.g., a web page) in response to multiple requests for the data that differ in form or content, according to one embodiment of the invention. Requests from different clients or users, or requests received during different sessions, include different session identifiers. In this embodiment, a cache system is configured to receive and service data requests on behalf of a data (e.g., web) server.

In state 200, a first data request for a set of data is received at the cache system from a first client, or a first user, or during a first session, etc. The data request includes a first session identifier, which may be in the form of a cookie, as in example (1):

GET //xyzzy.com/auction/viewitem?ItemNo=111
. . .
cookie: sesID=12345
. . .

As one alternative, the session identifier may be included as part of the URI or other identifier of the desired data, as in example (2):

http://xyzzy.com/auction/viewItem?ItemNo=111&sesID=12345

Illustratively, the session identifier was previously assigned by the data server or other element of the system (e.g., when the client first connected to the system) and transmitted to the client's browser or other user interface (e.g., a mini-browser for a wireless device). In return, the browser volunteers the session identifier each time it submits a request, if configured to allow cookies. Or, if the session identifier is embedded in URIs, then the browser provides the session identifier automatically.

Because this is the first request for this set of data, in state 202 the request is passed to the data server or the cache system examines the request to identify the desired data and requests that data from the data server by forwarding the request or sending a separate request.

In state 204, the data server identifies the desired data, retrieves or assembles it, and returns it to the cache system. Illustratively, the data may include a URI, URL or other suitable data identifier (e.g., within a hyperlink). If the requestor's session identifier is provided as part of a data identifier (i.e., instead of as a cookie), the data server may append the session identifier for this request to the data identifier(s) in the data being returned, or add it in some other manner. Alternatively, the cache system may perform this operation after receiving the requested data from the data server.

Also, if a session identifier was not already assigned, then, in states 202 and/or 204, the cache system may include a request for a session identifier, or the data server may automatically determine that a session identifier is needed (e.g., because the request does not include one). The data server would then automatically generate a unique session identifier and return it to the cache system, either with the data (e.g., as part of the URI) or separately.

In state 206 the cache system serves the data to the requester and caches it in a memory or storage device. The cached data may be identified or associated with the first request. In particular, the first request, or part of the first request (e.g., the URI or other data identifier), may be stored. The stored identification information may be used later when determining whether the data is responsive to a subsequent request. Illustratively, a subsequent request for data may be compared against the stored request (and requests stored in association with other cached data) to determine whether the requested data is cached.

In one implementation of this embodiment, the stored request (or request portion) for the data includes the session identifier. In another implementation, the session identifier is deleted, masked or replaced with a default value when the request is stored.

In state 208, a second request for the set of data is received at the cache system. Illustratively, the second request is for the same set of data, but the request differs in that it includes a second session identifier that is different from the first session identifier. The second request may also differ in other respects, parameters, tags or other content, but the basic URI (e.g., URL minus any session identifiers) or other basic data identifier matches that of the set of data. Thus, the second request may be from a different client, a different user, a different session, etc.

In state 210 the cache system parses the second request to identify the desired data (e.g., extract the data identifier), determine if the request includes a session identifier, extract the session identifier, and/or examine or extract other content from the request.

In state 212 the cache system searches its cache(s) for matching data. Illustratively, the cache system may examine data identifiers and/or full or partial requests associated with its cached data. For search purposes, the cache system may ignore, mask, delete or replace the session identifier of the second request and/or the session identifier(s) associated or stored with the cached data. Thus, the cache system is able to determine that the set of data cached in response to the first request is also responsive to the second request, even though the two requests differ.

In state 214 the cache system retrieves the set of data from storage and, in state 216, modifies the data if/as necessary. If, for example, the session identifier of the present requester is being provided to the system as part of a data identifier (e.g., rather than as a cookie), then the cache system may be configured to append the session identifier to, or insert it into, one or more data identifiers (e.g., URIs, hyperlinks) within the set of data being served. By ensuring the session identifier is included in the data identifier(s) of the requested data when served to the requester, the cache system may be able to ensure that the session identifier will be returned with any subsequent request from the same requestor.

In state 218 the cache system serves the set of data to the second requestor and the procedure ends. The data may now be identified in the cache system by the second request instead of, or in addition to, the first request. In one alternative embodiment, a set of cached data that may be served for multiple different requests may be identified by a particular request pattern that masks, omits or replaces the information (e.g., session identifier) that may differ from one request to the next.

In one embodiment of the invention, a session identifier may be used to tailor or customize a set of data to be served to a user. For example, when a cache system retrieves a requestor's session identifier from a request, the cache system may notify a data server even though the basic data to be served to the requestor is already cached. The data server may, in response, provide the cache system with additional or replacement data to be included in the data served to the requester, if such data is not already stored on the cache system. Such additional/replacement data may include a shopping cart for an electronic commerce site, a special price to be offered to the requester for a product, a particular set of graphic, audio or multimedia content, etc. Illustratively, the cache system will include the additional/replacement data in the data it serves to the requester.

Customizing Cached Data for Different Requests

In one embodiment of the invention, a set of data in a cache system may be customized, tailored or personalized—at the cache system—for service in response to requests for the data. Thus, in this embodiment, the customization task is relocated from a data server (e.g., web server, application server, database server) to the cache system.

The set of data may comprise a web page, a portion of a web page, or some other data that may be responsive to multiple requests or requestors. The set of data may be customized by personalizing it for a requestor (e.g., to include his or her name), including requestor-specific information (e.g., the requestor's shopping cart), or modifying it in some other way (to include a company logo, a custom graphic, a story that may be of interest to the requestor, an applet, etc.). For example, the data may be customized in one way if the requestor has a first status or attribute (e.g., uses a specific browser, belongs to a particular organization, has an account with an organization affiliated with the system) and a second way if the requestor has a second status or attribute.

Thus, instead of sending each request that requires a customized response to a data server, which would then assemble the custom data with data that may be commonly served for many requests, the cache system is configured to perform specified customization. The cache system may pass a first request for the common data to the data server, after which the common data will be cached and available for customization for subsequent requests. If, however, customization cannot be performed at the cache system (e.g., the custom data is not available), the request may be passed to the data server for satisfaction. The data server may generate or retrieve the custom data and provide it to the cache system so that a later request can be customized there.

Depending on the form, size or other attribute of the custom data that will be used to modify or supplement the common data, it may be stored in the cache system, may be received from a client request for the data or may be stored in some other location (e.g., on the data server). In the latter case, the cache system may be configured to retrieve the custom data when needed (e.g., when it parses a request and identifies how the common data should be customized).

The customization may involve a relatively simple operation, such as inserting a requestor's name in the common data—possibly in place of another requestor's name that was included in the data for a previous request—or inserting some source code or other content in the common data (e.g., a reference to a textual, audio or video file). For example, the customization may involve retrieving a graphic (e.g., a picture, an icon, a logo) or audio sample from storage and inserting it into the common data.

In one embodiment of this invention, a client request for a set of data includes the custom data, or information that can be used to retrieve or obtain the custom data (e.g., a session identifier, a data identifier such as a URI or URL). If the request includes the custom data, the custom data may simply be copied into the common data. If the request only identifies the custom data, the common data may then be retrieved and inserted.

In general, existing tools and languages (e.g., HTML, XML) for generating data that may be served in response to client requests do not provide for dynamic customization of cached data at a cache system. Thus, in one embodiment of the invention, data to be customized is tagged or marked to indicate where or how custom data is to be inserted. In particular, the application that produces the data may be configured to include tags or other markers at places in the data where custom data may be inserted or substituted. The application may also ensure that the custom data, or an identifier of the custom data, is provided to a client for the client to submit to the cache system with each request for customizable data. For example, the first time a client connects to the system or an associated web site, a data server may generate a session identifier, retrieve personal or tailored data about the client (e.g., name, organization), and provide this information to the client. The client may then return the information in each suitable request, either as a cookie (e.g., as a separate parameter of a request) or as part of a data identifier (e.g., a URI or URL). Illustratively, the cache system includes a parsing module configured to retrieve the custom data from the request, and/or to use information from the request to identify and retrieve the custom data.

In one embodiment of the invention, custom data (e.g., personal or tailored data) may be stored or maintained by a client's browser. For example, a user's shopping cart or other dynamic set of data may be included in several (or all) pages of a particular web site the user is browsing. The shopping cart data (e.g., item numbers, prices, total price) is updated as the user decides to make, change or abort purchases. The shopping cart data may be maintained as a cookie (or a parameter included in data requests, such as a data identifier) that is passed to the site with each user action or request. The cache system may store page contents other than the shopping cart and assemble these contents with the shopping cart data from the browser when a new page is to be served. One skilled in the art will appreciate that a web server need not be contacted each time the shopping cart or other set of dynamic data is altered, thereby decreasing resource consumption and response time.

Figure 3:
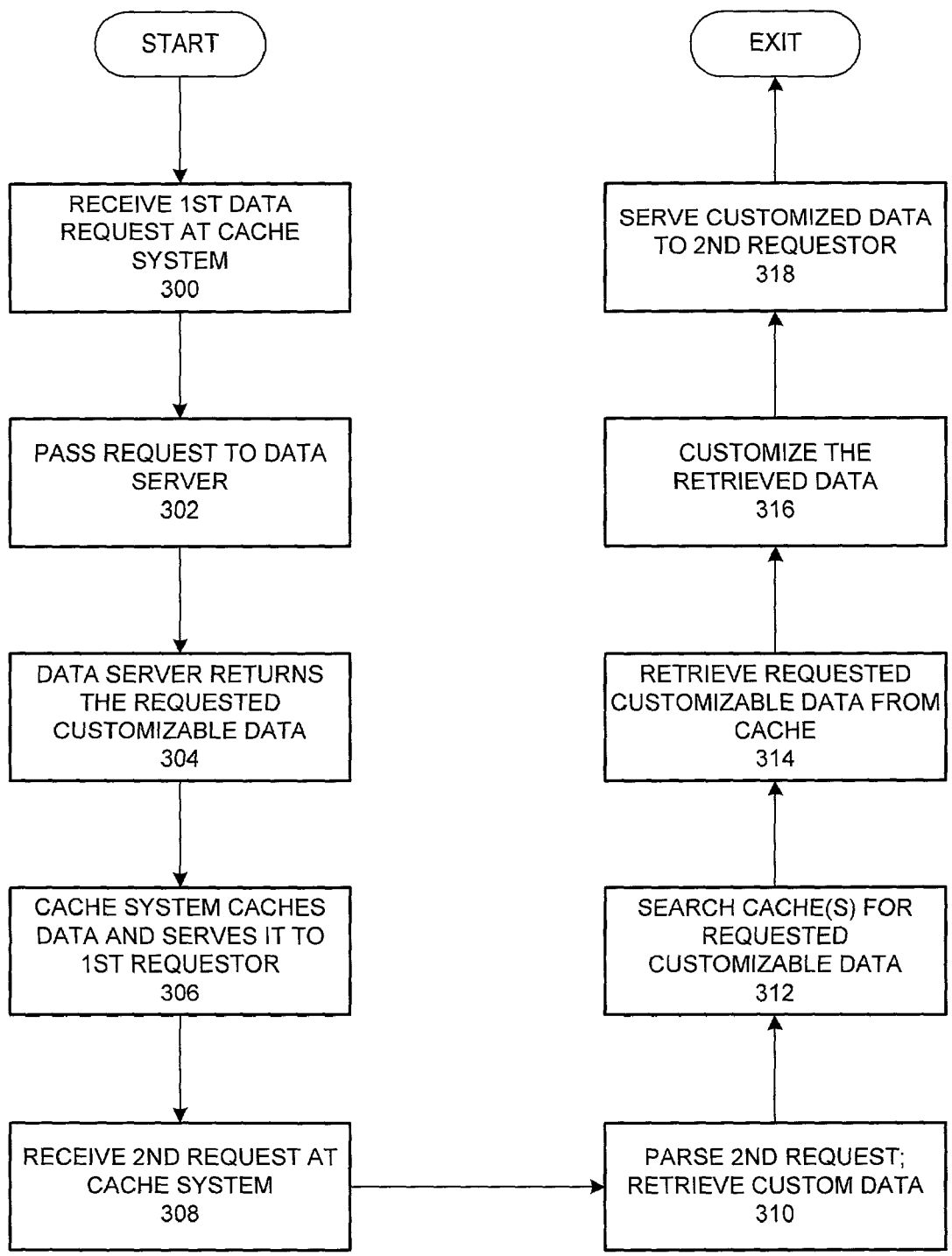
FIG. 3 is a flowchart illustrating one method of customizing a cached set of data for different client requests in accordance with an embodiment of the invention.

FIG. 3 demonstrates an illustrative procedure for customizing one set of cached data for serving in response to multiple client requests, where the data is supplemented with, or altered by, different custom data for different requests, according to one embodiment of the invention. In this embodiment, a data server, application server or web server operates an application for providing data to clients. A cache system coupled to the data server receives client requests, retrieves data from the data server, and serves responsive cached data when requested. Customizable data served by the data server, or provided to the cache system by the data server, includes tags or other means of identifying the customizable portion(s) of the data.

In state 300, a first client request for a set of data is received at the cache system. The cache system parses the first request to identify the desired data (e.g., by URI or other data identifier). The request also includes custom data that is to be included in the data served in response to the request, or information identifying such custom data. For example, the first request may include the requestor's name or other personal information, which is to be embedded in the served data. Or, the first request may include a unique session identifier that can be used to identify custom data.

Because the cache system does not have the requested set of data in its cache(s), the first request is passed or forwarded to the data server in state 302.

In state 304, the data server analyzes the request, retrieves the requested customizable data and may also assemble the custom data with the requested data so that the entire assembly may be returned intact. Alternatively, the data server may leave it to the cache system to perform the assembly.

As already described, the customizable data may include a tag to identify a location or portion of the data where custom data may be included or substituted. For example, the requested customizable data may include a pattern similar to the following:

Welcome <!-startTag="NameValue"->George <!-endTag->

In this example, a simple welcome message within the requested data is customizable to include a client or user's name. The name to be inserted between the start and end tags (e.g., in place of "George") may, in this example, be stored in a parameter or field named NameValue, which may be included in a client's data request.

In state 306 the data server returns the requested data to the cache server, where it is cached and served to the requester. The cache system may recognize the data as being customizable when it detects tags such as those in the example above. The cache server may detect the tags when it first caches the data (and may record the fact that the data is customizable and/or the customizable portions) or when it retrieves it to serve it for another request. Alternatively, the data server may explicitly alert the cache system when a customizable set of data is passed from the data server to the cache system.

In state 308, a second request for the set of data is received at the cache system. The second request may differ from the first request in any number of parameters, fields, values, etc. In particular, though, the second request includes (or identifies) custom data that may be substituted or inserted in the requested data to customize it for the second requester. To continue the above example, the second request may include the parameter or cookie "/NameValue=Thomas," which the cache system may extract when parsing the second request. Alternatively, the NameValue parameter may be combined with a data identifier that identifies the requested data, as in the following:

xyzzy.com/auction/viewItem?ItemNo=111&NameValue=Thomas

In alternative embodiments of the invention, a cache system may customize cached data on the basis of other information drawn from a client request. For example, if customizable data is to be supplemented with different content depending on a location of a requester, a client's user agent, a client's language, etc., the cache system may extract such information from a suitable field of information received with the request, a network address of the requester, etc.

In state 310 the cache system parses the second request to identify the desired data, identify custom data or extract an identifier of custom data (e.g., a file name, a session identifier, a URI), etc. The cache system also retrieves the custom data (e.g., from the request, a cache, the data server).

In state 312 the cache system searches its cache(s) for the requested data. The search may include attempting to match the second request, or a portion of the second request, against requests (or portions of requests) for which data has already been cached. During this search, the cache system may mask, replace or otherwise ignore certain information in the second request and/or the first request, such as session identifiers, the custom data or identifier of the custom data, etc.

In state 314 the requested customizable data is retrieved from a cache and, in state 316, the retrieved data is customized as necessary (e.g., to insert the custom data from the second request). Illustratively, the cache system already extracted the custom data from the second request (or retrieved it from other storage). Here, the cache system examines the cached data to determine where the custom data should be inserted or substituted. The cached data may include any number of tags, fields, hyperlinks or other places in which custom data may be placed, and a client request may similarly have any number of parameters or fields that include or identify custom data.

In state 318, the customized data is served in response to the second request and the procedure ends. The data, as customized for the second request, may now be cached in place of the version cached for the first request.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of operating a cache system to serve one set of cached data in response to multiple different data requests, comprising:

receiving a first request for a first set of data, said first request comprising a first session identifier configured to identify a first client session, wherein said first set of data is identifiable by a data identifier, and wherein said first session identifier identifies a first client to an application;

serving said first set of data from the cache system in response to said first request;

receiving a second request for said first set of data, said second request comprising a second session identifier different from said first session identifier, wherein each of said first request and said second request comprise said data identifier, and wherein said second session identifier identifies a second client to the application;

caching said first set of data;

associating a portion of said first request with said cached first set of data; and serving said first set of data from the cache system in response to said second request, wherein said serving said first set of data in response to said second request comprises:

searching the cache system for a set of data responsive to said second request, wherein said searching comprises comparing said associated portion of said first request to said second request, and wherein said searching involves replacing one or more of said first session identifier and said second session identifier with a default session identifier, customizing the set of data responsive to said second request based upon an identifier of custom data in the second request, and matching said first set of data with said second request.

2. The method of claim 1, wherein said data identifier is a URI (Uniform Resource Identifier).

3. The method of claim 1, wherein said first session identifier is combined with said data identifier in said first request; and wherein said second session identifier is combined with said data identifier in said second request.

4. The method of claim 1, wherein said portion comprises a combination of said data identifier and said first session identifier.

5. The method of claim 1, wherein said associating comprises replacing said first session identifier with a default session identifier.

6. The method of claim 1, further comprising, prior to said serving said first set of data in response to said second request:

inserting said second session identifier into one or more data identifiers within said first set of data.

7. The method of claim 6, wherein said inserting comprises replacing said first session identifier in a first data identifier with said second session identifier.

8. A method of serving one set of cached data, from a cache system, in response to a plurality of different data requests, wherein each data request comprises a different session identifier, the method comprising:

receiving a first request for a first set of data from a first client session, wherein said first request comprises:

a data identifier identifying said first set of data; and a first session identifier identifying said first client session, wherein said first session identifier identifies a first client to an application;

receiving said first set of data from a data server;

caching said first set of data, wherein said first set of data is identifiable in the cache system by information included in said first request;

receiving a second request for said first set of data from a second client session, wherein said second request comprises:

said data identifier; and a second session identifier identifying said second client session;

retrieving said first set of data from a cache, wherein said retrieving involves searching for a previous request for which said first set of data was cached, and wherein said second session identifier identifies a second client to the application; and serving said first set of data in response to said second request, wherein said serving said first set of data in response to said second request comprises:

searching the cache system for a set of data responsive to said second request, wherein said searching comprises comparing said associated portion of said first request to said second request, and wherein said searching involves replacing one of said first session identifier and said second identifier with a default value, customizing the set of data responsive to said second request based upon an identifier of custom data in the second request, and matching said first set of data with said second request.

9. The method of claim 8, wherein in said first request, said data identifier is combined with said first session identifier.

10. The method of claim 8, wherein said searching comprises comparing a portion of said second request with said information included in said first request.

11. The method of claim 8, further comprising, prior to said serving:

extracting said second session identifier from said second request; and combining said second session identifier with a first data identifier in said first set of data.

12. The method of claim 11, wherein said combining comprises replacing said first session identifier with said second session identifier.

13. A cache system for caching data from a data server, comprising:

a first cache memory configured to store a first data item, wherein said first data item is retrieved from a data server for serving in response to a first data request comprising a first session identifier, wherein said first session identifier identifies a first client to an application; and a parser configured to parse a second data request comprising a second session identifier different from said first session identifier, wherein said second session identifier identifies a second client to the application;

wherein said first data item is served in response to said second data request, wherein said serving said first set of data in response to said second request comprises:

searching the cache system for a set of data responsive to said second request, wherein said searching comprises comparing said associated portion of said first request to said second request, and wherein said searching involves replacing one of said first session identifier and said second identifier with a default value, customizing the set of data responsive to said second request based upon an identifier of custom data in the second request, and matching said first set of data with said second request.

14. The cache system of claim 13, wherein said first data request comprises a combination of a first data identifier of said first data item and said first session identifier and said second data request comprises a combination of said first data identifier and said second session identifier; and wherein said parser is configured to extract said second session identifier from said second data request.

15. The cache system of claim 13, wherein said first data item comprises a data identifier of another data item; and wherein said second session identifier is combined with said data identifier of said other data item prior to serving said first data item.

16. The cache system of claim 13, further comprising:

a second cache memory configured to store a first portion of said first data request, wherein said portion may be compared to a second portion of said second data request to determine if said first data item is responsive to said second data request;

wherein said first session identifier and said second session identifier are ignored during said comparison.

17. A cache system for serving one set of data in response to different data requests, comprising:

parsing means configured to examine a data request to identify a requested set of data;

retrieval means configured to retrieve a session identifier from said data request, wherein said session identifier identifies a first client to an application; and search means configured to search a cache for said requested set of data, wherein said search means is further configured to disregard said session identifier and a session identifier of a previous request in response to which said request set of data was served, and wherein said session identifier of the previous request identifies a second client to the application, and serving means configured to serve said first set of data from the cache system in response to said second request, wherein said serving means comprises:

searching means configured to search the cache system for a set of data responsive to said second request, wherein said searching comprises comparing said associated portion of said first request to said second request, and wherein said searching involves replacing one of said first session identifier and said second identifier with a default valued, customizing means for customizing the set of data responsive to said second request based upon an identifier of custom data in the second request, and matching means for matching said first set of data with said second request.

18. The cache system of claim 17, further comprising update means configured to update one or more data identifiers in said requested set of data to include said session identifier.

* * * * *